(No Model.)

J. H. SANDERSON.
CANOPY STANDARD.

No. 248,955. Patented Nov. 1, 1881.

Attest.
Sidney P. Hollingsworth.
Frank A. Law.

Inventor.
John H. Sanderson,
by Dodge & Son,
Attys.

UNITED STATES PATENT OFFICE.

JOHN H. SANDERSON, OF GREENFIELD, MASSACHUSETTS.

CANOPY-STANDARD.

SPECIFICATION forming part of Letters Patent No. 248,955, dated November 1, 1881.

Application filed August 15, 1881. (No model.)

*To all whom it may concern:*

Be it known that I, JOHN HORATIO SANDERSON, of Greenfield, in the county of Franklin and State of Massachusetts, have invented certain Improvements in Canopy-Standards, of which the following is a specification.

My invention relates to canopy-standards for use on carriages and vehicles of all descriptions; and it consists in forming the standard in two parts, and connecting said parts by a large stud or rivet having a neck or body to receive an annulus formed upon one of the sections of the standard, in combining with the annulus means for regulating at will the friction between it and its pivot or journal, and in other details hereinafter explained. The standard may be used singly at the middle or side of a seat or at the rear of a vehicle, or there may be two standards, one at either side.

Figure 1:
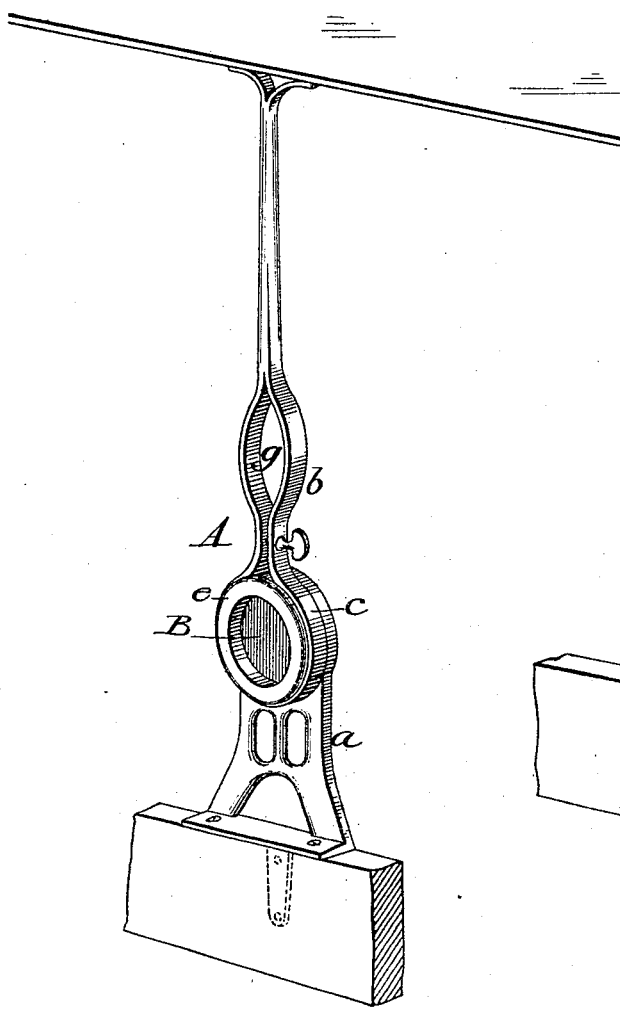
Figure 2:
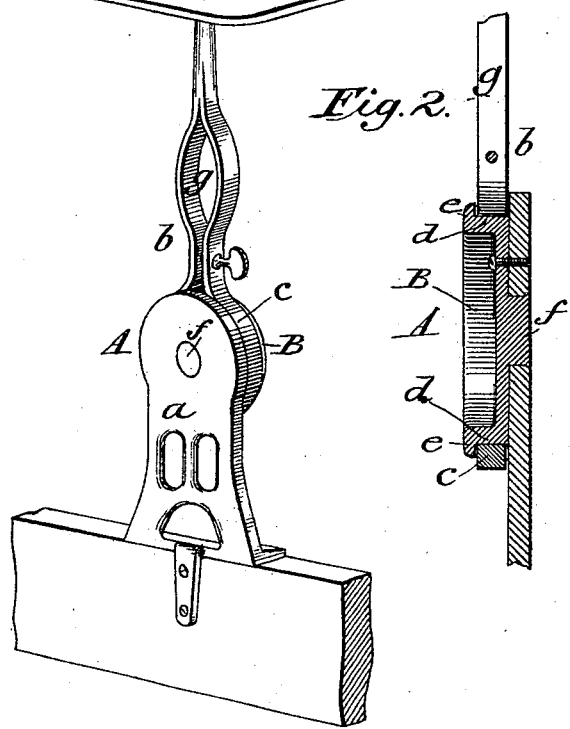

In the accompanying drawings, Figure 1 represents a perspective view of a canopy provided with my improved standards; Fig. 2, a vertical central section through the joint of one of the standards.

The object of this invention is to simplify and cheapen the construction of canopy supports or standards and to render their adjustment more expeditious and easy. To this end the joint is so formed that the friction between the two parts of the standard or between the moving portion and its pivot or journal shall be sufficient to retain the canopy in any position to which it may be adjusted, yet not so great as to prevent the ready change of adjustment by applying a moderate pressure to the upper portion of the standard.

The construction will be readily understood by referring to the drawings, in which A represents the standard, composed of a base-section, $a$, and a swinging or adjustable section, $b$; and B, the stud or rivet connecting said parts. The stud or rivet B is designed to connect the two sections of the standard and at the same time to form a journal for an annulus, $c$, formed upon one of said sections, and in its preferred form consists of the journal or neck $d$, provided at its outer face or edge with a radial flange, $e$, and having a stem or stud, $f$, projecting from its inner face, as shown in Fig. 2. When the stud or rivet is thus formed the annulus of the one section is arranged to encircle the journal $d$, and the stem $f$ is inserted through an opening in the other section and expanded, headed, or otherwise secured against removal and also against rotation.

It is apparent that the stud may be of uniform diameter from end to end, if desired; but the construction described and shown is preferred for the reason that the flange $e$ cannot be caused to bear directly upon the side of the annulus $c$, or to press thereon with any considerable force or friction, it being desired that the friction shall be produced and regulated solely by the binding or clamping of the annulus upon its journal. The annulus is made to fit so closely upon its journal or pivot $d$ as to produce a considerable degree of friction between them, which may be augmented to any desired extent by means of a screw or other clamping device, the annulus being open at one side, as shown at $g$, to permit it to be contracted or expanded, as may be found necessary.

In practice, that section of the standard upon which the annulus is formed is preferably bifurcated, the opening between the two stems or branches extending some distance from the open side of the annulus to afford sufficient elasticity to render the clamping or release of the annulus certain and easy. Thus formed, the two branches can be drawn together and the annulus be made to bind upon its journal to any desired extent by means of a bolt or screw, B, passing through both branches, as shown.

In order that the degree of friction between the hub or journal and annulus may be varied at will without the aid of special tools, the screw is formed with a button or thumb-piece, by which it may be turned when necessary.

In the practical use of the standards it is intended that the screws or clamping devices shall be set to produce a proper degree of friction and then left at such adjustment, the top or canopy being moved to any point or position desired by simply applying pressure sufficient to overcome the friction, which, after the pressure ceases, will retain the canopy in its adjusted position. It is, however, apparent that the screws or clamping devices may be loosened in adjusting the top or canopy when desirable so to do.

While I have described the journal or connecting-rivet as being made solid, it is obvious that it may be formed of sheet metal spun up or drawn up in dies, or it may be cast hollow in order to render it light and cheap. It is likewise obvious that the journal may be formed directly upon either section of the standard and a flanged cap or plate employed to retain the annulus in place thereon. These and like modifications will readily suggest themselves to the practical mechanic.

I am aware that a standard-joint has been made in which a grooved hub or disk was embraced and clamped by a two-part clamp encircling the same, and I do not claim such construction. In my device the annulus is continuous and unbroken, and opens or springs from the hub or journal by reason of its inherent elasticity when the clamping device is loosened. Having no loose or detachable parts, there is no rattling or noise produced by its movement, and since the annulus cannot open sufficiently to pass over the flange of the hub or journal, it is impossible for it to become displaced, even though the clamping-screw be entirely removed.

Having thus described my invention, what I claim is—

1. The herein-described joint for canopy-standards, consisting of a hub or journal and a continuous unbroken encircling annulus fitting closely thereon, substantially as set forth.

2. A joint for canopy-standards, consisting of a hub or journal, an elastic encircling annulus, and means, substantially such as shown and described, for causing the annulus to bind upon the hub, as explained.

3. A joint for canopy-standards, consisting of a hub or journal and an unbroken encircling annulus held in place by a flange projecting radially beyond the circumference of said journal.

4. A canopy-standard consisting of the sections $a$ $b$ and the connecting stud or rivet, constructed and applied as shown.

5. In combination with the standard-section $a$, having an opening to receive a rivet, and the section $b$, having the annulus $c$, the stud or rivet B, provided with the journal $d$, flange $e$, and stem $f$.

JOHN HORATIO SANDERSON.

Witnesses:
E. P. MARSH,
F. M. THOMPSON.